Oct. 26, 1965     H. C. GOLDTHORPE     3,214,132

VALVE DEVICE

Filed Oct. 11, 1962     2 Sheets-Sheet 1

INVENTOR.
HAROLD C. GOLDTHORPE
BY *Robert C. Brown*
ATTORNEY

United States Patent Office 3,214,132
Patented Oct. 26, 1965

3,214,132
VALVE DEVICE
Harold C. Goldthorpe, Orangevale, Calif., assignor to Aerojet-General Corporation, Azusa, Calif., a corporation of Ohio
Filed Oct. 11, 1962, Ser. No. 229,798
2 Claims. (Cl. 251—173)

This invention relates to a "butterfly valve," which type of valve comprises a plate pivoted in opposite sides of the pipe to be controlled by turning the plate to extend across the pipe to close the valve or to lie edgewise in the flow of fluid to open the valve, the valve plate in closed position engaging with a peripheral valve seat.

Such valves are simple in structure provided that complete sealing is not required as for instance in an automobile carburetor, but require careful design where complete sealing is required and particularly when high pressures or wide variations in termperatures are present.

It is an object of the present invention to provide a butterfly valve having a spring loaded sealing element affording an efficient sealing action even at low pressures when the valve is closed.

It is a further object of the invention to provide a butterfly valve construction which will function efficiently under wide variations of temperature of the fluid to be controlled.

Another object of the invention is to provide a butterfly valve construction having a sealing element subjected to the pressure on the upstream side as the valve is closed thus automatically increasing the pressure between the sealing element and the edge of the valve plate with increase of pressure.

Another object of the invention is to provide a butterfly valve of wide usefulness and having a long life with minimum maintenance and replacement requirements.

Still further objects and features of the invention will hereinafter appear from the following description read together with the accompanying illustrative drawings in which.

Figure 1:
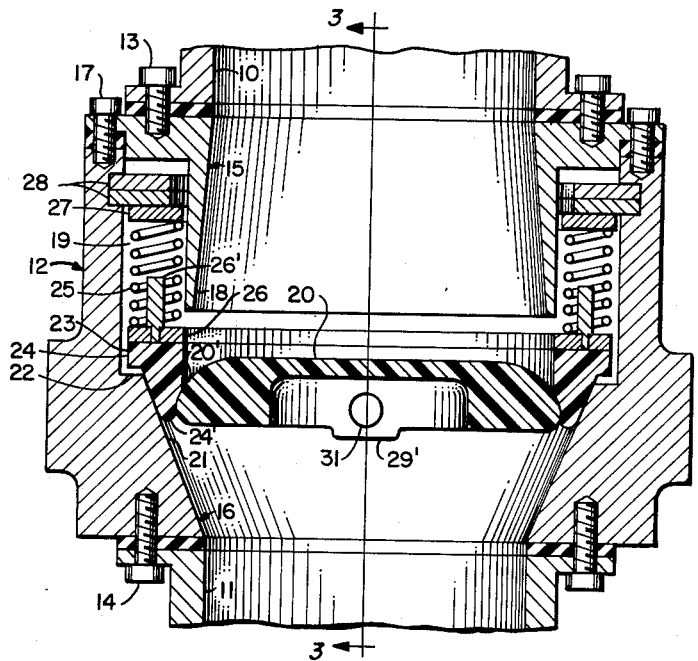
FIGURE 1 is a longitudinal section through the valve in closed position.

Referring now to FIGURE 1 the numerals 10 and 11 indicate the upstream and downstream lengths of pipe respectively bolted to the valve casing generally indicated at 12, by bolts 13 and 14.

The casing comprises two parts 15 and 16 bolted together by bolts 17. It will be understood that the bolts 13, 14, and 17 extend completely around the structure.

The casing part 15 is positioned on the upstream side of the valve and is formed with a tapered skirt 18 spaced from the inner wall of the part 16 to provide a peripheral chamber 19 on the upstream side of the valve plate 20 which is formed with an outwardly bowed edge 20'.

The casing part 16 is formed with a seat 21 which is angled inwardly from a point about at a level with the plane of the valve plate 20 when extending across the interior of the valve casing in fully closed position, the end of the seat 21 of lesser diameter being on the downstream side of the valve plate 20 and being of the same inside diameter as pipe 11. A peripheral shoulder 22 is provided between the wider diameter end of seat 21 and the upper portion of casing part 16.

Figure 2:
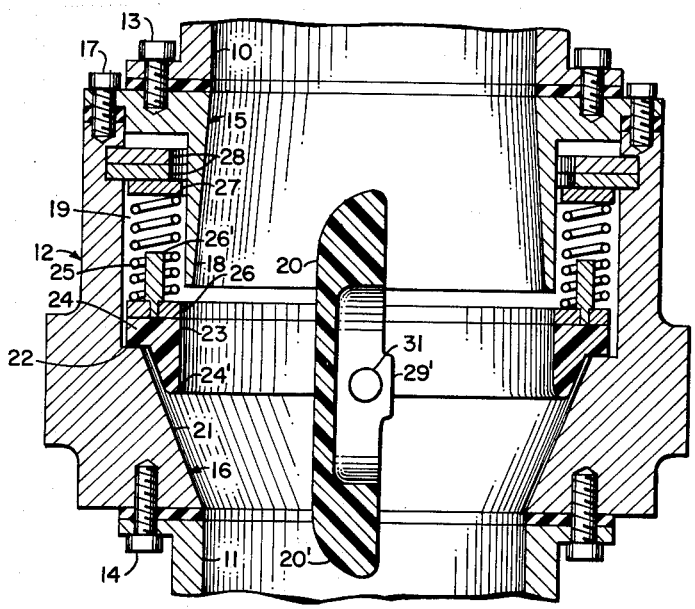
FIGURE 2 is a longitudinal section through the valve but showing the valve plate in open position.

A valve ring seal 23 in the form of a molded ring of hard rubber or plastic material, such as "Teflon" is provided with a rectangular portion 24 underlying the open end of peripheral chamber 19, and with an axially extended portion 24'. The outer face of portion 24' is inclined to rest against the angled seat 21 on casing part 16 and the inner face of ring seal 23 is parallel to the common axis of pipes 10 and 11 for a portion of the face but increasing in diameter toward the end engaged by the disc 20 to form a V angle with the outer edge of the valve disc 20 and also with the inclined portion 24' of the seal. The conical outer surface of portion 24' is smaller than the conical inner surface of seat 21 so as to provide a gap between the two when the rectangular portion 24 is resting on shoulder 22 as shown in FIGURE 2. The slidable relation of valve seat 23 to seat 21 provides for relative movement therebetween on closing of the valve as shown in FIGURE 1.

A plurality of helical springs 25 are spaced circumferentially in the peripheral space 19. A metal washer 26 is placed between the springs and seal 23 and is effective to evenly distribute the thrust of the springs to the seal 23. Upwardly extending pins 26' on washer 26 serve to position the springs 25 uniformly about the washer. A second metal washer 27 is interposed between the opposite ends of the springs 25 and the casing part 15; the stiffness of the springs may be adjusted by using washers 27 of different thickness. Two snap rings 28 are positioned in a grove in the casing 12 above the washer 27 to retain the springs 25 and disc 20 in position before affixing casing part 15 to part 16. By using two snap rings, disassembly of the springs 25 from the valve may be made a safe operation by first removing the top snap ring from the casing 12 to release the load of the springs and thereafter removing the lower snap ring. If only one snap were used, removal of it without first releasing the load from the springs might result in the snap ring being projected through the air and striking the person disassembling the valve.

It will be noted that the edge 20' of the valve plate 20 curves outwardly from the upstream face toward the downstream face of the edge and is joined thereto by a fair curve. The V angled portion of the seal 23 engages, in the closed position of the valve disc 20, the angled seat 21 and the angled edge 20' of the valve plate and is urged into such engagement by the pressure of springs 25.

Figure 3:
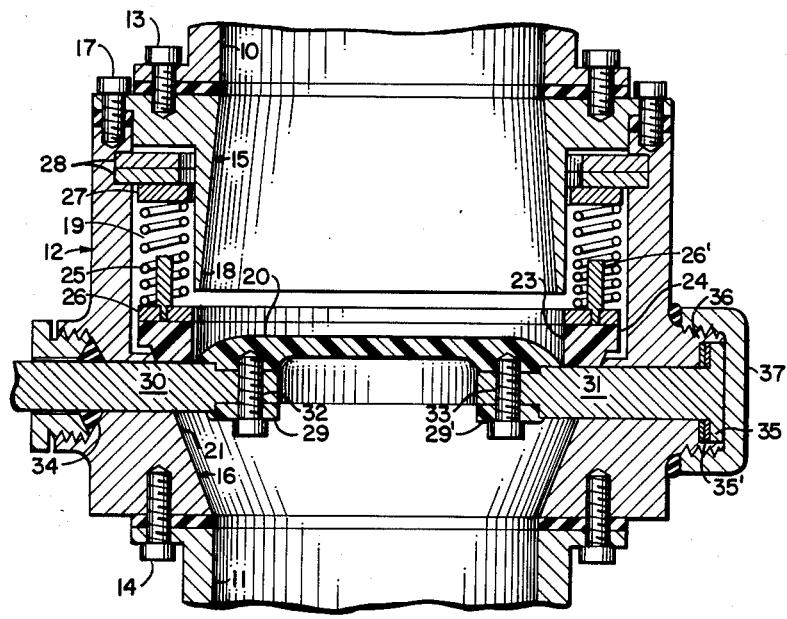
FIGURE 3 is a sectional view taken on line 3—3 in FIGURE 1.

As best seen in FIGURE 3, the valve plate 20 is cast with diametrically opposite bosses 29 and 29' on its downstream face and these bosses are drilled to receive lengths of shafts 30 and 31 retained in position by pins 32, 33. Shaft 30 is shown as passing through a packing gland 34 to means at the end of the shaft (not shown) for operating the valve. Shaft 31 is shown with a shoulder or head 35 resting on a boss 36 on the outer wall of part 16 of the casing. The valve plate 20 may be accurately adjusted relatively to the valve seal 23 by shims 35' placed between shoulder 35 and the boss 36 and held in adjusted position by a cap 37 screwed onto the boss 36.

It is to be noted that the meeting faces of the valve plate edge 20' and the tapered edge of the valve ring seal are formed with a fair curve and engage with a firm pressure although the valve disc edge moves in opposite directions on opposite sides of the valve, the resilience of the one piece ring seal accommodating itself to the edge of the disc.

The material of the ring seal 23 is sufficiently resilient to accurately fit with the edge 20' of the valve disc and distortion of the valve seal is prevented by the helical spring 25 which may be spaced as required around the seal, the pressure of the springs being distributed over the seal by the metal washer 26.

The fluid controlled by the valve has access to the peripheral chamber 19 in which the springs are positioned and the pressure of the fluid will be added to the pressure exerted by the springs to prevent distortion of the valve seal. In the open position of the valve as seen in FIG- URE 2 the rectangular portion 24 of the seal will rest against shoulder 22 of the casing part 16 at positions intermediate the shafts 30, 31. However, the ring seal is molded to fit closely around the shafts at the locations the shafts pass through the ring seal and the seat on which it is supported, the springs acting at all times to hold the ring seal firmly against the shafts and seat so that leakage at these points is prevented. The valve structure is, of course, provided with the usual gaskets to prevent leakage at joints.

The ring seal 23 is a one piece member of material giving long wear and the engagement of the curved edge 20' of the valve disc with the seal does not cause abrasion or deterioration of the seal even at high pressures.

The provision of the spring means to apply loading to the ring seal is effective to ensure effective functioning of the valve under conditions causing considerable variation in the dimensions of the valve structure such as in handling fluids at very low temperatures.

A preferred embodiment of the invention has been herein described and shown by way of illustration, but not as limitation of the invention since various modifications may be made in the embodiment described by those skilled in the art without departing from the scope of the invention as defined by the appended claims.

I claim:

1. A butterfly valve comprising a valve casing, a valve plate formed with an outwardly bowed edge, means including diametrical pivots mounting said valve plate in said valve casing; a peripheral seat in said casing downstream of and immediately adjacent said valve plate, said seat having an inwardly facing sloping wall and diminishing in inside diameter in downstream direction; a valve seal of unitary construction mounted on said seat in slidable relation thereto having an outer face sloped to fit with the sloping wall of said seat, a peripheral recess in said seat, a peripheral recess in said valve casing which is open to the water pressure upstream of said valve plate, a plurality of springs in said recess acting against the upstream side of said seal to urge it against said outwardly bowed edge of the valve plate when in its closed position and an annular washer of rigid material positioned between said springs and said seal to distribute the effort of said springs over said seal at all times.

2. A butterfly valve comprising a valve casing, a valve plate formed with an outwardly bowed edge, means including diametrical pivots mounting said valve plate in said valve casing; a peripheral seat in said casing downstream of and immediately adjacent said valve plate, said seat having an inwardly facing sloping wall and diminishing in inside diameter in downstream direction; a valve seal of unitary construction mounted on said seat in slidable relation thereto having an outer face sloped to fit with the sloping wall of said seat, said seal comprising a one piece ring-like member of rectangular cross-section in its upstream portion and having an outwardly tapered cross section in the portion engaged by the edge of said valve plate, a peripheral recess in said valve casing which is open to the water pressure upstream of said valve plate and a plurality of springs in said recess acting against the upstream side of said seal to urge it against said outwardly bowed edge of the valve plate when in its closed position.

References Cited by the Examiner

UNITED STATES PATENTS

| | | | |
|---|---|---|---|
| 1,343,735 | 6/20 | MacBryde | 251—176 XR |
| 1,919,856 | 7/33 | McGeorge | 251—172 XR |
| 2,796,230 | 6/57 | Grove et al. | 251—172 |
| 2,934,309 | 4/60 | Morser | 251—159 |
| 2,992,655 | 7/61 | Davis | 251—177 XR |

FOREIGN PATENTS

| | | |
|---|---|---|
| 209,857 | 8/57 | Australia. |
| 521,545 | 8/53 | Belgium. |

LAVERNE D. GEIGER, *Primary Examiner.*